(12) United States Patent
Coleman et al.

(10) Patent No.: US 11,263,216 B2
(45) Date of Patent: Mar. 1, 2022

(54) DECENTRALIZED AGGREGATION AND COLLECTION OF DATA FROM MULTIPLE SOURCES

(71) Applicant: International Business Machines Corporation, Armonk, NY (US)

(72) Inventors: Andrew J. Coleman, Petersfield (GB); John A. Reeve, Winchester (GB); Trevor C. Dolby, Southampton (GB); Matthew E. Golby-Kirk, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 16/777,991

(22) Filed: Jan. 31, 2020

(65) Prior Publication Data

US 2021/0240711 A1    Aug. 5, 2021

(51) Int. Cl.
*G06F 16/2455* (2019.01)
*G06F 16/28* (2019.01)
*G06F 16/2458* (2019.01)
*G06F 16/23* (2019.01)

(52) U.S. Cl.
CPC .... *G06F 16/24556* (2019.01); *G06F 16/2365* (2019.01); *G06F 16/2471* (2019.01); *G06F 16/28* (2019.01)

(58) Field of Classification Search
None
See application file for complete search history.

(56) References Cited

U.S. PATENT DOCUMENTS

| 2017/0251025 | A1 | 8/2017 | Varley et al. |
| 2018/0315141 | A1 | 11/2018 | Hunn et al. |
| 2019/0171849 | A1 | 6/2019 | Assenmacher |
| 2020/0028692 | A1* | 1/2020 | Wu ............. G06F 9/5038 |
| 2020/0210402 | A1* | 7/2020 | Hu ............. H04L 9/3247 |
| 2021/0132869 | A1* | 5/2021 | Tian ............. G06F 3/0659 |

FOREIGN PATENT DOCUMENTS

CN      108062671 A    5/2018

OTHER PUBLICATIONS

Gorenflo, Christian, et al., "FastFabric: Scaling Hyperledger Fabric to 20,000 Transactions per Second", IEEE Jul. 2019, pp. 455-463. (Year: 2019).*

* cited by examiner

*Primary Examiner* — Scott A. Waldron
(74) *Attorney, Agent, or Firm* — Edell, Shapiro & Finnan, LLC (57) ABSTRACT

A computer system performs decentralized collection and aggregation of data. A plurality of requests for data are transmitted, by a data collection server, to a corresponding plurality of remote servers, wherein the plurality of remote server submit responses to the plurality of requests for data to a distributed data structure. The distributed data structure is accessed, by the data collection server, to retrieve the plurality of responses to the plurality of requests. The plurality of responses are aggregated, by the data collection server, into a message and the message is transmitted to an entity requesting data collection. Embodiments of the present invention further include a method and program product for performing decentralized collection and aggregation of data in substantially the same manner described above.

17 Claims, 6 Drawing Sheets

DECENTRALIZED AGGREGATION AND COLLECTION OF DATA FROM MULTIPLE SOURCES

BACKGROUND

1. Technical Field

Present invention embodiments relate to integrating data obtained from multiple sources, and more specifically, to decentralized aggregation and collection of data from multiple sources.

2. Discussion of the Related Art

Integration products include a field of software architecture that focuses on system interconnection, electronic data interchange, product data exchange, and distributed computing environments. Such solutions enable multiple systems or applications to integrate with each other in order to exchange data using various communication protocols. While a computing node collects and aggregates data from other network-accessible computing systems, it may be difficult to share the current state of the computing node with other computing systems, as the state information may be private to the computing node. Moreover, since state information cannot be shared, independent auditing of the data collection and aggregation process may not be possible.

SUMMARY

According to one embodiment of the present invention, a computer system performs decentralized collection and aggregation of data. A plurality of requests for data are transmitted, by a data collection server, to a corresponding plurality of remote servers, wherein the plurality of remote server submit responses to the plurality of requests for data to a distributed data structure. The distributed data structure is accessed, by the data collection server, to retrieve the plurality of responses to the plurality of requests. The plurality of responses are aggregated, by the data collection server, into a message and the message is transmitted to an entity requesting data collection. Embodiments of the present invention further include a method and program product for performing decentralized collection and aggregation of data in substantially the same manner described above.

BRIEF DESCRIPTION OF THE DRAWINGS

Generally, like reference numerals in the various figures are utilized to designate like components.

DETAILED DESCRIPTION

Present invention embodiments relate to integrating data obtained from multiple sources, and more specifically, to the decentralized aggregation and collection of data from multiple sources. Data integration solutions typically include data aggregation capabilities within their flow models. In order to fulfill a request for information, a computing node may collect data from multiple sources before aggregating the data and sending to the requesting entity. For example, if an application requests price quotes for a product from multiple suppliers, a computing node may send a request for a price quote to computing systems associated with each supplier, may collect the responses, and may aggregate the responses into a message that includes all of the price quotes.

In order to complete a data collection and aggregation task, a computing node may be required to maintain its state during the entire process of collecting and aggregating data. This state information may include pending messages that form a collection (e.g., individual responses to data requests) as well as any associated metadata that is used by a computing node for the purpose of grouping messages and determining when a collection is complete. Thus, if a computing node does not maintain its state, any received data would be lost, requiring data collection operations to be repeated. State information is stored in a persistent store that is typically private to the computing node, making the sharing of state information difficult or impossible.

In contrast, present invention embodiments enable state information to be shared by collecting and aggregating data in a decentralized manner. In particular, when a computing node sends requests for information to other computing systems, those systems respond by providing the requested data to a distributed data structure, which may include a distributed ledger or a blockchain. The computing node may then access the distributed data structure to retrieve the requested information. Thus, the distributed data structure provides an immutable, real-time record of every state change, which enables real-time third party auditing (e.g., for regulatory compliance or other reasons). This immutable audit trail may prevent future disputes over the identities of parties and/or the content of the request and/or responses. Moreover, by maintaining a distributed data structure with a multi-organizational network, support may be provided for business use-cases that require the sharing of state information between multiple organizations' servers, including untrusted partners.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
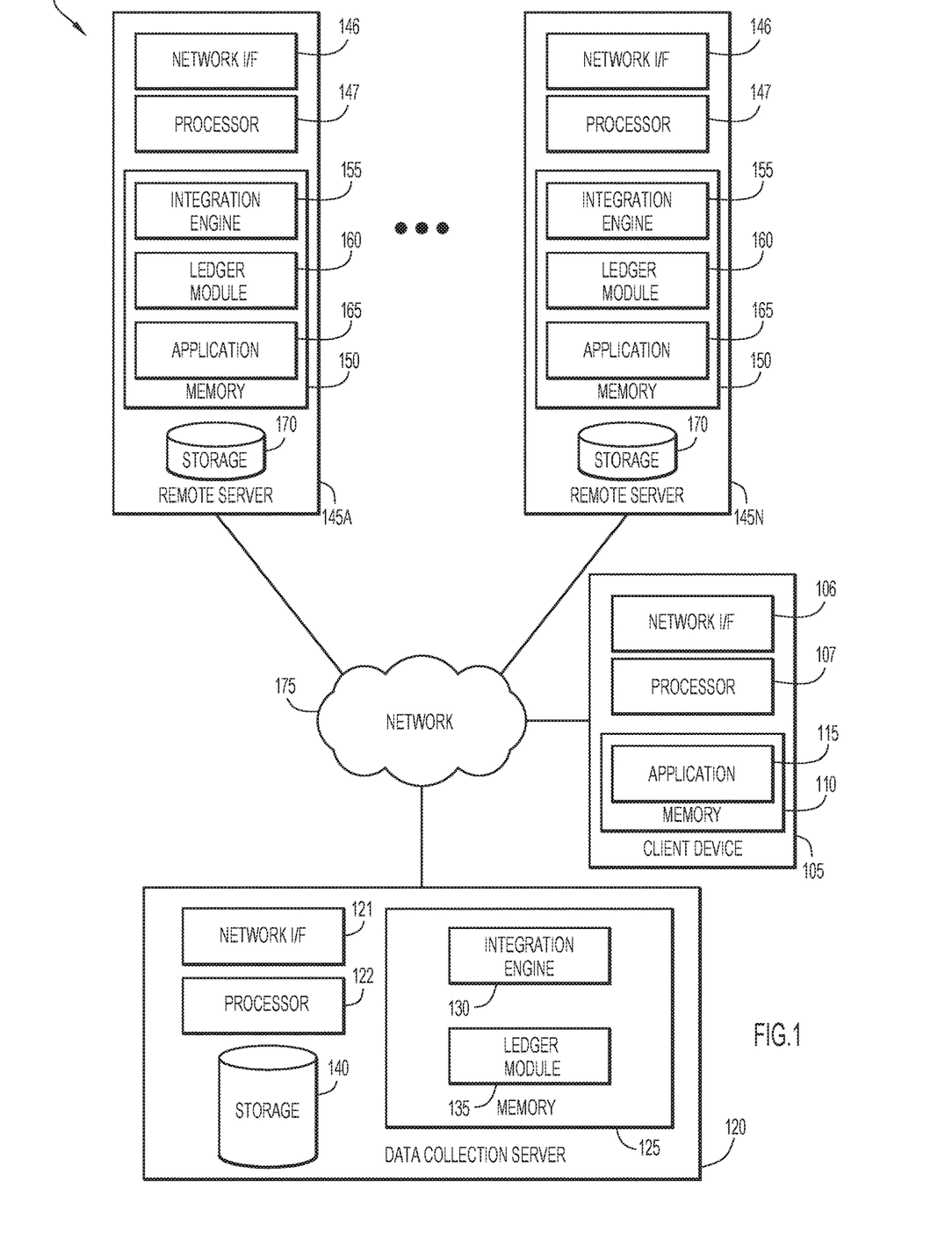
FIG. 1 is a block diagram depicting a computing environment for performing decentralized collection and aggregation of data in accordance with an embodiment of the present invention.

Present invention embodiments will now be described in detail with reference to the Figures. FIG. 1 is a block diagram depicting a computing environment 100 for performing decentralized collection and aggregation of data in accordance with an embodiment of the present invention. As depicted, computing environment 100 includes a client device 105, a data collection server 120, remote servers 145A-145N, and a network 175. It is to be understood that the functional division among components of computing environment 100 have been chosen for purposes of explaining present invention embodiments and is not to be construed as a limiting example.

Client device 105 includes a network interface (I/F) 106, at least one processor 107, and memory 110 that includes an application 115. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 175. In general, client device 105 sends requests for data, which data collection server 120 handles by performing data collection and aggregation operations. Client device 105 may include internal and external hardware components, as depicted and described in further detail with respect to FIG. 6.

Application 115 may include one or more modules or units to perform various functions of present invention embodiments described below. Application 115 may be implemented by any combination of any quantity of software and/or hardware modules or units, and may reside within memory 110 of client device 105 for execution by a processor, such as processor 107.

Application 115 may send a request to data collection server 120 to perform data collection and aggregation operations, and may receive a response to the request that include the requested data. Application 115 may automatically send requests for data (e.g., in the course of executing predetermined/scheduled operations or as a result of receiving instructions from another computing device), and/or a user of client device 105 may provide input that instructs application 115 to send a request for data. Data requested by application 115 may include any data obtainable from one or more sources (e.g., remote servers 145A-145N). In particular, a data request of application 115 may include individual same or similar requests for data from multiple entities. For example, a data request of application 115 may include a request for pricing data for a particular product from various servers each associated with a different supplier. Accordingly, requested data that is received by application 115 may be compared or otherwise processed further to perform additional actions. Additionally or alternatively, application 115 may be included as a component of data collection server 120 or any of remote servers 145A-145N.

Data collection server 120 includes a network interface (I/F) 121, at least one processor 122, and memory 125. Memory 125 may include an integration engine 130 and a ledger module 135. Data collection server 120 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 121 enables components of data collection server 120 to send and receive data over a network, such as network 175. In general, data collection server 120 collects and aggregates data to satisfy data requests by applications, such as application 115 of client device 105. Data collection server 120 may include internal and external hardware components, as depicted and described in further detail with respect to FIG. 6.

Integration engine 130 and/or ledger module 135 may include one or more modules or units to perform various functions of present invention embodiments described below. Integration engine 130 and/or ledger module 135 may be implemented by any combination of any quantity of software and/or hardware modules or units, and may reside within memory 125 of data collection server 120 for execution by a processor, such as processor 122.

Integration engine 130 responds to requests for data by performing operations such as collecting data from various sources, aggregating collected data, and transmitting, sharing, or otherwise making available collected and/or aggregated data. In particular, when data collection server 120 receives a request for data from an application (e.g., application 115), integration engine 130 may convert the request into individual requests that are each sent to a different data server, such as remote servers 145A-145N. Responses to the requests are provided to a distributed ledger, which can be accessed by ledger module 135 in order to provide integration engine 130 with the responses. Thus, integration engine 130 may indirectly obtain data that integration engine 130 requested from remote servers 145A-145N, by accessing a distributed ledger that stores the data, instead of simply receiving the data from remote servers 145A-145N (e.g., via one or more data packets transmitted by remote servers 145A-145N and destined for data collection server 120). Additionally or alternatively, integration engine 130 may obtain some responses directly from a data source, such as remote server 145A. In some embodiments, integration engine 130 may respond to requests for data by obtaining the requested data locally, e.g., by accessing storage 140 of data collection server 120.

A data collection task may be completed when integration engine 130 obtains responses to each individual request for data and/or upon timeout of any unanswered requests. When a data collection is completed (or remaining pending requests have timed out), integration engine 130 aggregates the individual responses into a single message and transmits the message to the application that initiated the data request (e.g., application 115 of client device 105).

Ledger module 135 enables data collection server 120 to access a distributed ledger, such as a blockchain, in order to obtain requested data and state information. Ledger module 135 may enable data collection server 120 to act as a peer in a peer-to-peer computing network that maintains a distributed ledger. Thus, data collection server 120 and its components may write data to a distributed ledger and/or read data from a distributed ledger via ledger module 135. Ledger module 135 may perform any operations associated with operating and maintaining a distributed ledger, including managing storage of a local copy of the ledger (or portions thereof), performing consensus operations, and the like. Ledger module 135 may update a stored local copy of a distributed ledger in response to events, such as new information, such as new information being added to the distributed ledger or the ledger being updated, etc. Ledger module 135 may receive block event messages from one or more peers responsible for maintaining a distributed ledger, which serve as notifications that the ledger has been updated.

Storage 140 may include any non-volatile storage media known in the art. For example, storage 140 can be implemented with a tape library, optical library, one or more independent hard disk drives, or multiple hard disk drives in a redundant array of independent disks (RAID). Similarly, data in storage 140 may conform to any suitable storage architecture known in the art, such as a file, a relational database, an object-oriented database, and/or one or more tables. In some embodiments, storage 140 may store data relating to the collection and aggregation of data, including data requests and responses, aggregations of collected responses, state information, and the like. Additionally or alternatively, storage 140 may store a copy of a distributed ledger or portions thereof.

Remote servers 145A-145N each include a network interface (I/F) 146, at least one processor 147, and memory 150. Memory 150 may include an integration engine 155, a ledger module 160, and an application 165. Remote servers 145A-145N may each include a laptop computer, a tablet computer, a netbook computer, a personal computer (PC), a desktop computer, a personal digital assistant (PDA), a smart phone, or any programmable electronic device capable of executing computer readable program instructions. Network interface 146 enables components of remote servers 145A-145N to send and receive data over a network, such as network 175. In general, remote servers 145A-145N respond to requests for data that are received from data collection server 120. Each remote server 145A-145N may include internal and external hardware components, as depicted and described in further detail with respect to FIG. 6.

Integration engine 155, ledger module 160, and/or application 165 may include one or more modules or units to perform various functions of present invention embodiments described below. Integration engine 155, ledger module 160, and/or application 165 may be implemented by any combination of any quantity of software and/or hardware modules or units, and may reside within memory 150 of each remote server 145A-145N for execution by a processor, such as processor 147.

Integration engine 155 and ledger module 160 of remote servers 145A-145N may each be substantially similar or identical to integration engine 130 and ledger module 135, respectively, of data collection server 120 in terms of capabilities and operations that are performed. In particular, integration engine 155 of remote servers 145A-145N may enable each remote server to initiate requests for data from other servers and/or to respond to received requests for data. Ledger module 160 enables each remote server 145A-145N to read data from a distributed ledger and/or to write data to the distributed ledger. In some embodiments, data collection server 120 and remote servers 145A-145N are peers in a peer-to-peer network that hosts a distributed ledger via their respective ledger modules 135 and 160.

Application 165 may retrieve data requested as part of a collection by data collection server 120. In particular, application 165 may receive a request for data and may query a local database to retrieve the data. Retrieved data may be provided to ledger module 160 for submitting to a distributed ledger. Application 165 may access data stored in storage 170 in order to satisfy data requests.

Storage 170 may include any non-volatile storage media known in the art. For example, storage 170 can be implemented with a tape library, optical library, one or more independent hard disk drives, or multiple hard disk drives in a redundant array of independent disks (RAID). Similarly, data in storage 170 may conform to any suitable storage architecture known in the art, such as a file, a relational database, an object-oriented database, and/or one or more tables. Storage 170 may store any data, including data that may be requested by application 115 and/or data collection server 120. Additionally or alternatively, storage 140 may store a copy of a distributed ledger or portions thereof.

Network 175 may include a local area network (LAN), a wide area network (WAN) such as the Internet, or a combination of the two, and includes wired, wireless, or fiber optic connections. In general, network 175 can be any combination of connections and protocols known in the art that will support communications between client device 105, data collection server 120, and/or remote servers 145A-145N via their respective network interfaces in accordance with embodiments of the present invention.

Figure 2:
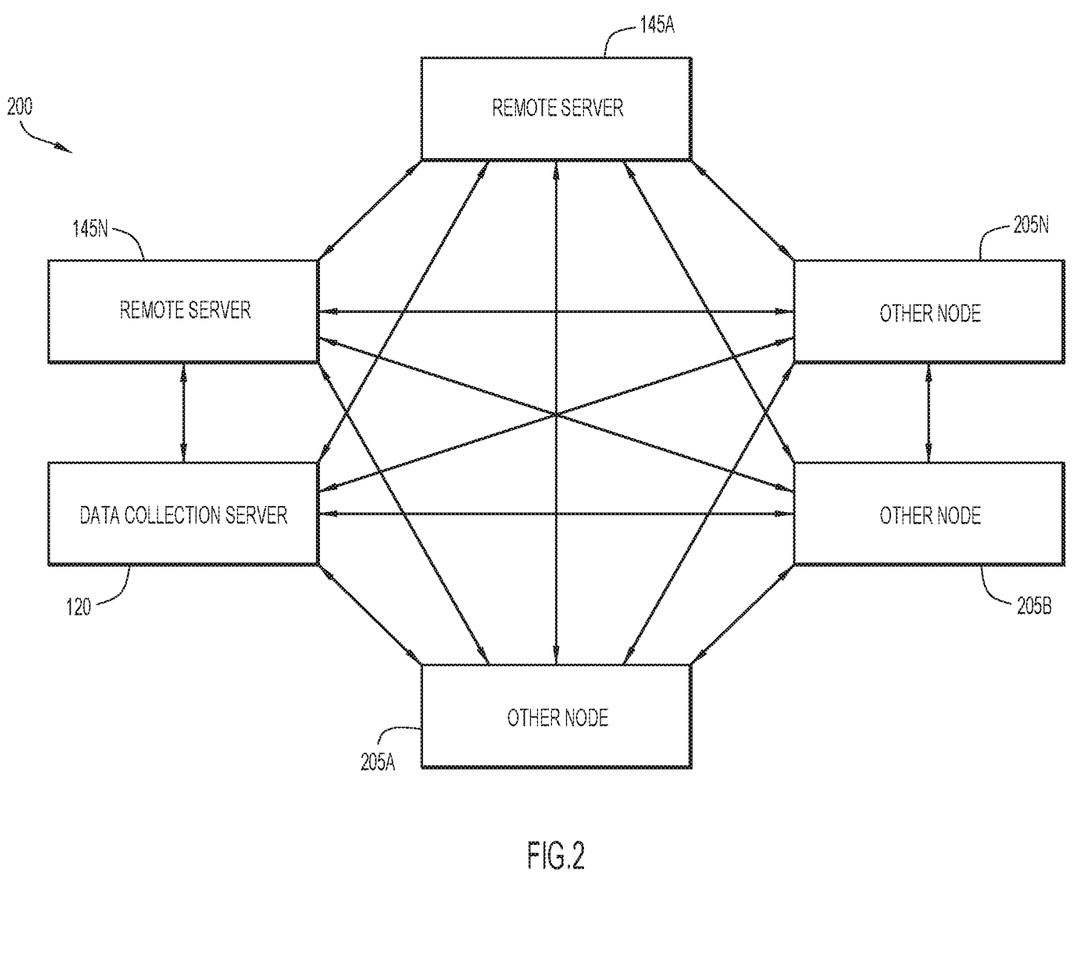
FIG. 2 is a block diagram depicting a peer-to-peer network for hosting a distributed ledger in accordance with an embodiment of the present invention.

FIG. 2 is a block diagram depicting a peer-to-peer network 200 for hosting a distributed ledger in accordance with an embodiment of the present invention. As depicted, peer-to-peer network 200 includes as peers data collection server 120, remote servers 145A-145N, and other nodes 205A-205N. Together, these peers collectively host a distributed ledger of records. In particular, the peers of peer-to-peer network 200 may collectively support a distributed ledger by validating new blocks and locally storing copies of the distributed ledger (or portions thereof). The peers of peer-to-peer network 200 may utilize a known or other protocol for peer-to-peer inter-node communication in order to perform operations such as collective validation of entries in the ledger, etc. When a new entry or an update to an entry is validated, each peer may update its local copy of the distributed ledger. One or more peers of peer-to-peer network 200 may transmit a notification to other peers to indicate that a change has been made to the ledger. Thus, data collection server 120 may obtain data provided by remote servers 145A-145N to the distributed ledger by accessing any validated and updated copy of the ledger provided by any peer.

Figure 3:
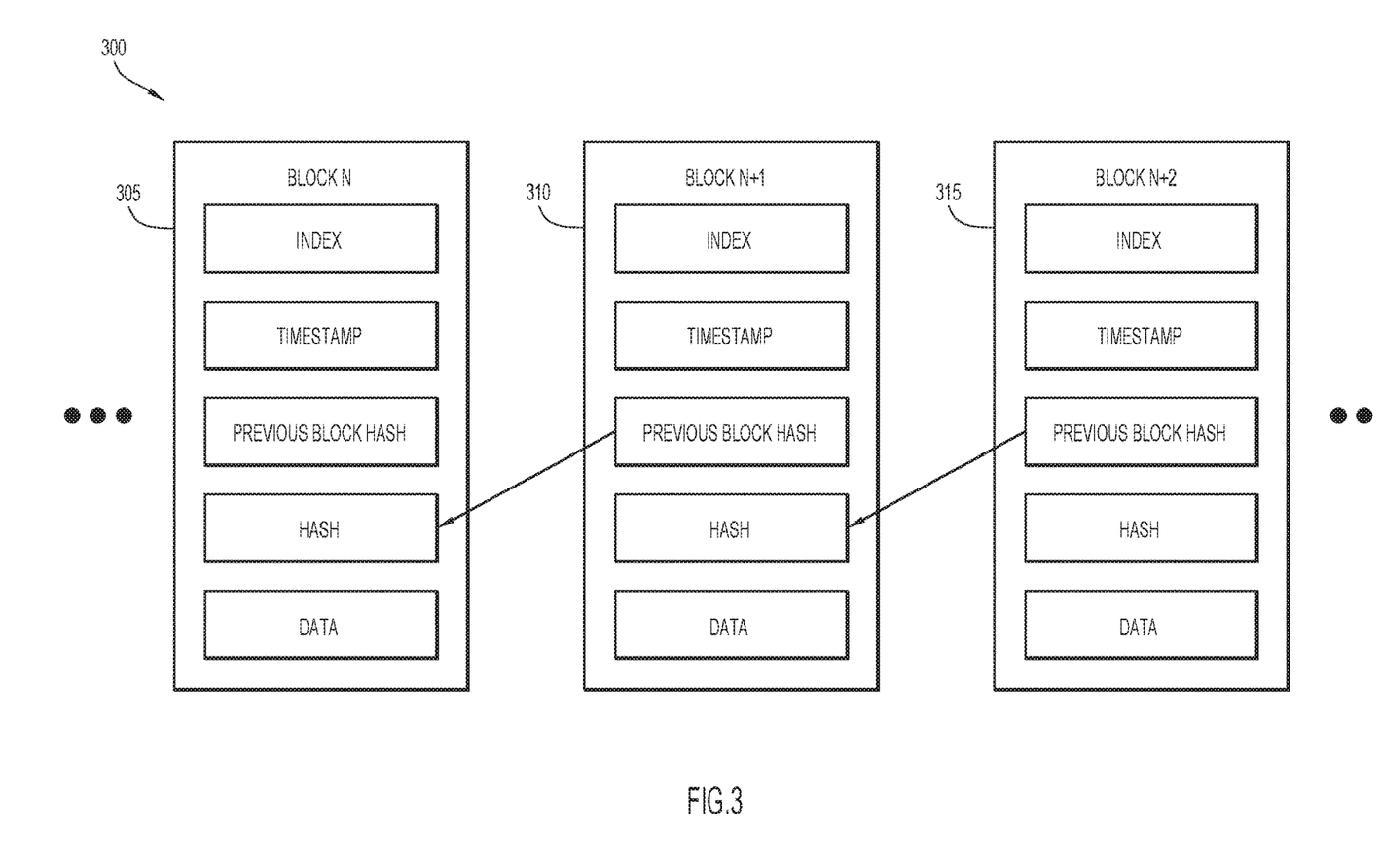
FIG. 3 is a block diagram depicting a distributed ledger for collecting and aggregating data in accordance with an embodiment of the present invention.

FIG. 3 is a block diagram depicting a distributed ledger 300 for collecting and aggregating data in accordance with an embodiment of the present invention. As depicted, there are three blocks, block N (305), block N+1 (310), and block N+2 (315). It should be appreciated that this depiction of a distributed ledger 300 is only a portion of the ledger, and information can be stored as an entry in any block in distributed ledger 300. In some embodiments, distributed ledger 300 is a blockchain.

Each block 305-315 includes an index, a timestamp, a previous block hash, a hash, and data. The index of a block includes an identifier for the block, such as a unique key. The timestamp of a block may indicate when the block was created, validated, and/or last modified. The previous block hash contains a hash of information in the previous block, which in turn capture, via their own hash, information in the next preceding block, ensuring that data recorded in distributed ledger 300 is immutable. Each hash may be a cryptographic hash, and may include a hash of the data stored in its block as well as the data corresponding to the previous block's hash. Thus, once recorded, the data in any given block cannot be altered retroactively without alteration of all subsequent blocks, which requires consensus of the network majority.

Figure 4:
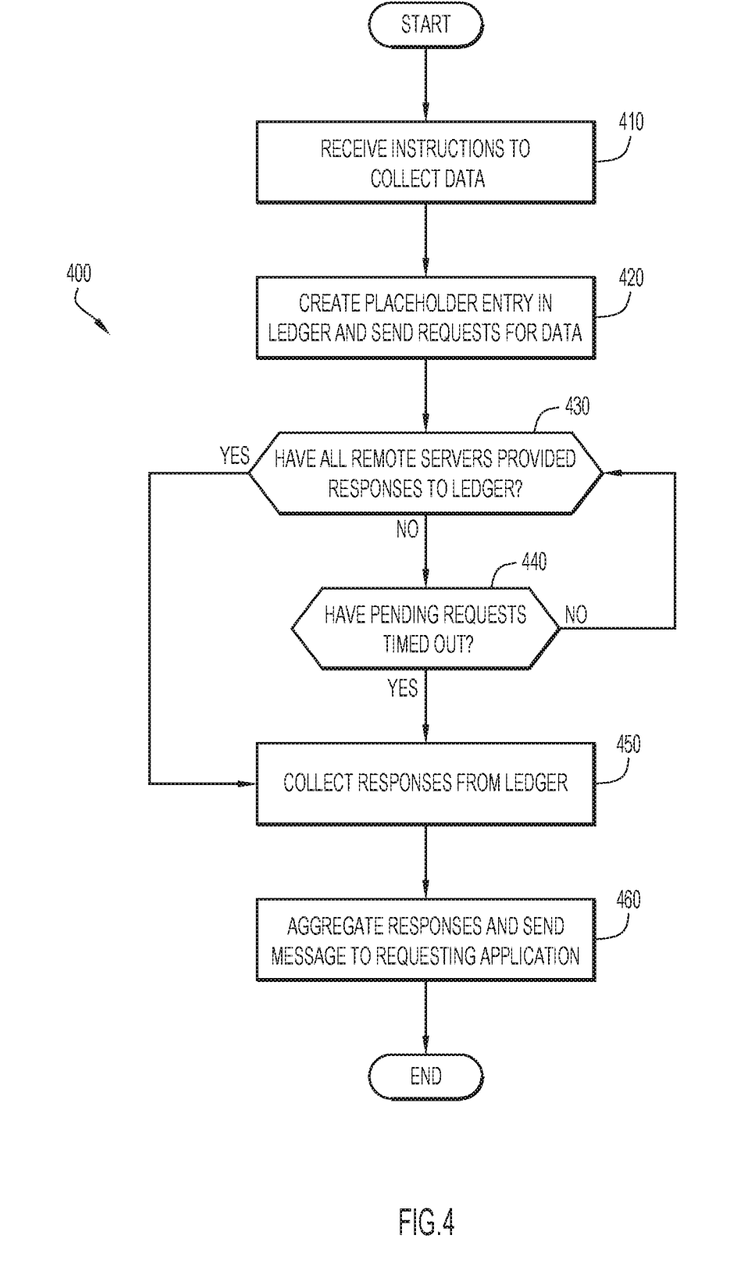
FIG. 4 is a flow chart depicting a method of performing decentralized collection and aggregation of data in accordance with an embodiment of the present invention.

FIG. 4 is a flow chart depicting a method 400 of performing decentralized collection and aggregation of data in accordance with an embodiment of the present invention.

Instructions to collect data are received at operation 410. An aggregation node, such as data collection server 120, may receive instructions to collect data; the instructions may be sent by client device 105, and the data may be stored in one or more locations, such as remote servers 145A-145N. The received instructions may specify the data that is to be collected and may specify one or more locations to query for the requested data. Alternatively, integration engine 130 may determine which locations to query for data based on one or more features of the data being requested.

A placeholder entry is created in a distributed ledger, and requests for data are sent at operation 420. Ledger module 135 may create a placeholder entry in a distributed ledger, passing along the location of the entry to integration engine 130. The location of the placeholder entry may be indicated according to the index of a block of the distributed ledger in which the placeholder entry is made, a timestamp of the block, a unique composite key, and/or any other information that can identify the location of the placeholder entry in the distributed ledger.

The location of the placeholder entry may be included along with each request for data that is sent to the remote systems storing the data. When a remote system, such as any of remote servers 145A-145N, receives a request for data, the request is processed to retrieve the requested data, and the remote system writes the data (e.g., state information) to the distributed ledger at the specified location of the placeholder entry. In some embodiments, a request for data is converted to calls by application 165, which provides the data to ledger module 160 for submitting to the distributed ledger. Thus, the placeholder entry is updated by a remote system to include the requested data in the ledger.

Operation 430 determines whether all of the remote servers have provided responses to the distributed ledger. In some embodiments, ledger module 135 checks the distributed ledger at predetermined time intervals to determine whether remote servers 145A-145N have all provided responses to the distributed leger. In some embodiments, ledger module 135 subscribes to block events emitted by peer-to-peer network 200 in order to determine when one or more of the remote servers 145A-145N have provided their responses to the distributed ledger. In some embodiments, a remote server may transmit a notification to data collection server 120 to indicate that the remote server has updated the placeholder entry with requested data. Alternatively, in embodiments in which data collection server 120 does not write a placeholder entry, remote servers 145A-145N may add entries to the ledger and notify data collection server 120 that the requested data is available, and additionally, remote servers 145A-145N may each notify data collection server 120 of the location of the data in the distributed ledger.

If any of the remote servers have not yet provided responses to the distributed ledger, operation 440 determines whether the pending requests have timed out. If a predetermined amount of time has elapsed without a remote server providing a response to the distributed ledger, then the responses that are available are collected at operation 450. If the pending requests have not yet timed out, method 400 returns to operation 430 to determine whether all of the remove servers have provided their responses to the ledger.

The responses are collected from the distributed ledger at operation 450. Ledger module 135 may access the entry or entries of the distributed ledger where the responses are stored in order to retrieve the responses. Retrieved responses are shared to integration engine 130.

The responses are aggregated into a message and the message is sent to the application requesting the aggregated data at operation 460. Integration engine 130 aggregates received responses into a single message that may be transmitted back to client device 105 as a reply to the request for data initiated by application 115 of client device 105. In some embodiments, the message may indicate whether any individual requests timed out or whether the collection of responses is complete.

Thus, in one example, a banking integration flow may process a complex transaction by making several parallel requests to backend systems, including external third-party services, in order to fulfill the transaction. Data collection server 120 gathers the responses according to embodiments presented herein to complete the transaction. For regulatory compliance purposes, an external regulator verifies the integrity of all of the data comprising the transaction response. Thus, the external regulator can operate a peer in peer-to-peer network 200 to access the distributed ledger. Since the ledgers in both organizations' peers are guaranteed to be identical, the external regulator may conduct a real-time independent audit.

In another example, a requestor may fan out a set of quote requests to suppliers to start a new collection group. Suppliers may provide their quotes and add to the collection via their own aggregation nodes (e.g., remote servers 145A-145N) that maintain synchronized copies of a ledger. The requestor may be notified when all quotes are collected (or time out), and the identity, value, and timestamp of each quote is recorded in the ledger to avoid later contractual or other disputes. Values associated with each supplier's quote may be visible to the other suppliers, or data can be kept private, e.g., by adding public key encryption logic to the node logic.

Figure 5:
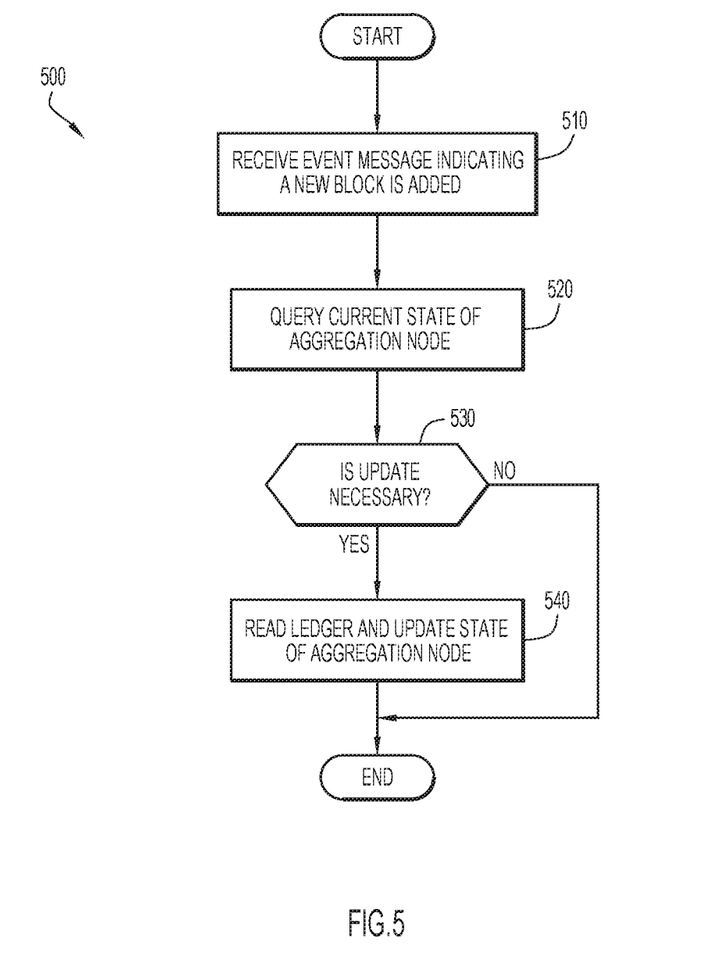
FIG. 5 is a flow chart depicting a method of updating an aggregation node that is coupled to another aggregation node in accordance with an embodiment of the present invention.

FIG. 5 is a flow chart depicting a method 500 of updating an aggregation node that is coupled to another aggregation node in accordance with an embodiment of the present invention. An aggregation node, such as data collection server 120, may be coupled to another aggregation node, such as remote server 145A so that state information is shared between the coupled nodes. State information may include any information, such as an indication of the network devices from which responses can be expected, how many responses have been received at a current time, timeout conditions, information relating to the completeness of a collection, such as whether a collection of data has been collected and is ready for onward processing, and the like. Thus, a coupled aggregation node may read current state information from the distributed ledger every time that another coupled aggregation node makes an update. Coupling nodes provides for the parallelization of collection and aggregation operations, enabling data integration activities to be performed more quickly and efficiently.

An event message indicating that a new block has been added to the ledger is received at operation 510. A callback handler may be registered with an aggregation node that responds to event messages that are triggered each time a new block or entry is added to the distributed ledger.

A current state of the aggregation node is queried at operation 320. The current state of the aggregation node may include any responses received by the aggregation node, as well as corresponding metadata. The callback handler may query the current state of the aggregation node, which is compared to the state information in the distributed ledger at operation 330. The Operation 330 determines whether an update is necessary: if the aggregation node's current state does not match the state information in the distributed ledger, then data is read from the ledger and the state of the aggregation node is updated at operation 340. In some embodiments, if the updated internal state of the aggregation node includes a completed collection, the received data may be aggregated and prorogated to the requesting application (e.g., application 115) accordingly.

Figure 6:
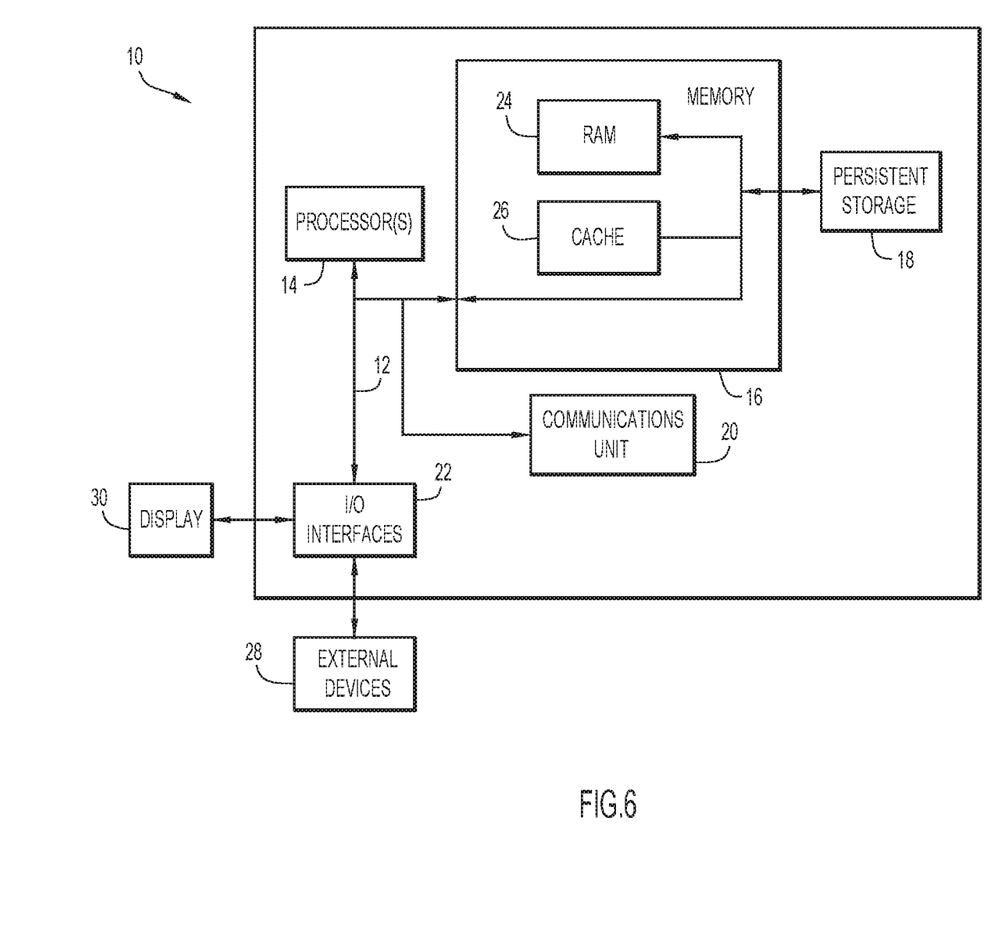
FIG. 6 is a block diagram depicting a computing device in accordance with an embodiment of the present invention.

FIG. 6 is a block diagram depicting components of a computer 10 suitable for executing the methods disclosed herein. Computer 10 may implement client device 105, data collection server 120, and/or remote servers 145A-145N in accordance with embodiments of the present invention. It should be appreciated that FIG. 6 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to decentralized aggregation and collection of data (e.g., data requests and responses, metadata associated with data requests and responses, aggregations of collected responses, state information, distributed ledger data, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105, data collection server 120, remote servers 145A-145N, and/or other nodes 205A-205N may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to decentralized aggregation and collection of data (e.g., data requests and responses, metadata associated with data requests and responses, aggregations of collected responses, state information, distributed ledger data, etc.) may include any information provided to, or generated by, client device 105, data collection server 120, remote servers 145A-145N, and/or other nodes 205A-205N. Data relating to decentralized aggregation and collection of data may include any desired format and arrangement, and may include any quantity of any types of fields of any size to store any desired data. The data relating to decentralized aggregation and collection of data may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to decentralized aggregation and collection of data), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of decentralized aggregation and collection of data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, application 115, integration engine 130, ledger module 135, integration engine 155, ledger module 160, application 165, etc.). These systems may include any types of monitors and input devices (e.g., keyboard, mouse, voice recognition, etc.) to enter and/or view information.

It is to be understood that the software (e.g., communications software, server software, application 115, integration engine 130, ledger module 135, integration engine 155, ledger module 160, application 165, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, application 115, integration engine 130, ledger module 135, integration engine 155, ledger module 160, application 165, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to decentralized aggregation and collection of data). The database system may be implemented by any number of any conventional or other databases, data stores or storage structures (e.g., files, databases, data structures, data or other repositories, etc.) to store information (e.g., data relating to decentralized aggregation and collection of data). The database system may be included within or coupled to the server and/or client systems. The database systems and/or storage structures may be remote from or local to the computer or other processing systems, and may store any desired data (e.g., data relating to decentralized aggregation and collection of data).

The present invention embodiments may employ any number of any type of user interface (e.g., Graphical User Interface (GUI), command-line, prompt, etc.) for obtaining or providing information (e.g., data relating to decentralized aggregation and collection of data), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, integrating data that is requested from multiple sources in a decentralized, immutable manner.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for decentralized collection and aggregation of data, the computer-implemented method comprising:
   transmitting, by a data collection server, a plurality of requests for data to a corresponding plurality of remote servers, wherein the plurality of remote servers submit responses to the plurality of requests for data to a blockchain that is collectively hosted by the data collection server, the plurality of remote servers and one or more other nodes as peers in a network, wherein the one or more other nodes validate new blocks and locally store data of the blockchain, including data of the responses to the plurality of requests for data that are submitted by the plurality of remote servers;
   accessing, by the data collection server, the blockchain to retrieve the plurality of responses to the plurality of requests; and
   aggregating, by the data collection server, the plurality of responses into a message and transmitting the message to an entity requesting data collection.

2. The computer-implemented method of claim 1, further comprising:
   creating, by the data collection server, a placeholder entry in the blockchain for each remote server of the plurality of remote servers; and
   wherein the data collection server further transmits location information of each placeholder entry to the plurality of remote servers, and wherein the remote servers submit the responses to the request by updating the placeholder entry based on the location information.

3. The computer-implemented method of claim 1, further comprising:
   reading, by the data collection server, one or more entries of the blockchain to update an internal state of the data collection server in response to receiving an event message indicating that an entry has been added to the blockchain.

4. The computer-implemented method of claim 3, wherein the data collection server is associated with an additional data collection server, and wherein the additional data collection server adds the entry to the blockchain.

5. The computer-implemented method of claim 1, wherein the data collection server accesses the blockchain to receive the data in response to receiving an event message indicating that an entry has been updated in the blockchain.

6. The computer-implemented method of claim 1, wherein the data collection server accesses the blockchain to receive the data in response to a predetermined amount of time elapsing since transmitting the plurality of requests.

7. A computer system for decentralized collection and aggregation of data, the computer system comprising:
   one or more computer processors;
   one or more computer readable storage media;
   program instructions stored on the one or more computer readable storage media for execution by at least one of the one or more computer processors, the program instructions comprising instructions to:
   transmit, by a data collection server, a plurality of requests for data to a corresponding plurality of remote servers, wherein the plurality of remote servers submit responses to the plurality of requests for data to a blockchain that is collectively hosted by the data collection server, the plurality of remote servers and one or more other nodes as peers in a network, wherein the one or more other nodes validate new blocks and locally store data of the blockchain, including data of the responses to the plurality of requests for data that are submitted by the plurality of remote servers;
   access, by the data collection server, the blockchain to retrieve the plurality of responses to the plurality of requests; and
   aggregate, by the data collection server, the plurality of responses into a message and transmit the message to an entity requesting data collection.

8. The computer system of claim 7, wherein the program instructions further comprise instructions to:
   create, by the data collection server, a placeholder entry in the blockchain for each remote server of the plurality of remote servers; and
   wherein the data collection server further transmits location information of each placeholder entry to the plurality of remote servers, and wherein the remote servers submit the responses to the request by updating the placeholder entry based on the location information.

9. The computer system of claim 7, wherein the program instructions further comprise instructions to:
   read, by the data collection server, one or more entries of the blockchain to update an internal state of the data collection server in response to receiving an event message indicating that an entry has been added to the blockchain.

10. The computer system of claim 9, wherein the data collection server is associated with an additional data collection server, and wherein the additional data collection server adds the entry to the blockchain.

11. The computer system of claim 7, wherein the data collection server accesses the blockchain to receive the data in response to receiving an event message indicating that an entry has been updated in the blockchain.

12. The computer system of claim 7, wherein the data collection server accesses the blockchain to receive the data in response to a predetermined amount of time elapsing since transmitting the plurality of requests.

13. A computer program product for decentralized collection and aggregation of data, the computer program product comprising one or more computer readable storage media collectively having program instructions embodied therewith, the program instructions executable by a computer to cause the computer to:
   transmit, by a data collection server, a plurality of requests for data to a corresponding plurality of remote servers, wherein the plurality of remote servers submit responses to the plurality of requests for data to a blockchain that is collectively hosted by the data collection server, the plurality of remote servers and one or more other nodes as peers in a network, wherein the one or more other nodes validate new blocks and locally store data of the blockchain, including data of the responses to the plurality of requests for data that are submitted by the plurality of remote servers;
   access, by the data collection server, the blockchain to retrieve the plurality of responses to the plurality of requests; and
   aggregate, by the data collection server, the plurality of responses into a message and transmit the message to an entity requesting data collection.

14. The computer program product of claim 13, wherein the program instructions further cause the computer to:

create, by the data collection server, a placeholder entry in the blockchain for each remote server of the plurality of remote servers; and wherein the data collection server further transmits location information of each placeholder entry to the plurality of remote servers, and wherein the remote servers submit the responses to the request by updating the placeholder entry based on the location information.

15. The computer program product of claim 13, wherein the program instructions further cause the computer to:

read, by the data collection server, one or more entries of the blockchain to update an internal state of the data collection server in response to receiving an event message indicating that an entry has been added to the blockchain.

16. The computer program product of claim 15, wherein the data collection server is associated with an additional data collection server, and wherein the additional data collection server adds the entry to the blockchain.

17. The computer program product of claim 13, wherein the data collection server accesses the blockchain to receive the data in response to receiving an event message indicating that an entry has been updated in the blockchain.

* * * * *